United States Patent [19]
Sollman et al.

[11] 4,143,027
[45] Mar. 6, 1979

[54] ORGANOFUNCTIONAL SILANE COUPLING AGENT-POWDER MIXTURES

[75] Inventors: Kenneth J. Sollman, Brewster; Robert J. Pickwell, Mt. Kisco, both of N.Y.; Maurice W. Ranney, Tokyo, Japan

[73] Assignee: Union Carbide Corporation, New York, N.Y.

[21] Appl. No.: 903,406

[22] Filed: May 8, 1978

Related U.S. Application Data

[63] Continuation of Ser. No. 483,015, Jun. 25, 1974, abandoned.

[51] Int. Cl.$^2$ ............................................. C08K 9/06
[52] U.S. Cl. .............................. 260/42.15; 106/308 Q; 428/405
[58] Field of Search ................. 106/308 Q; 260/42.15, 260/765, 42.44

[56] References Cited

U.S. PATENT DOCUMENTS

| 3,350,345 | 10/1967 | Vanderbilt et al. | 260/42.15 |
| 3,567,680 | 3/1971 | Iannicelli | 106/308 Q |
| 3,768,537 | 10/1973 | Hess et al. | 106/308 Q |
| 3,873,489 | 3/1975 | Thurn et al. | 260/42.15 |

Primary Examiner—Winston A. Douglas
Assistant Examiner—J. V. Howard
Attorney, Agent, or Firm—Reynold J. Finnegan

[57] ABSTRACT

Mercapto-silane powder mixtures are described having superior shelf life and which are readily added during compounding of rubbers to provide a desirable amount of the silane therein.

6 Claims, No Drawings

ORGANOFUNCTIONAL SILANE COUPLING AGENT-POWDER MIXTURES

This application is a continuation of our prior U.S. application Ser. No. 843,015 filed June 25, 1974, now abandoned.

This invention relates to novel silane-powder concentrates useful for providing such silanes in compounded rubber formulations. More particularly, this invention is concerned with mercapto silane-powder concentrates which possess superior shelf-life stability and which have excellent flow properties allowing their ready use in large scale manufacture of rubber compounds.

Organofunctional silanes containing hydrolyzable groups are known to be useful coupling agents. This means that they function to tightly join two dissimilar materials, one typically inorganic which binds to the Si portion of the silane or its derivative siloxane, the other typically organic which usually covalently, sometimes ionically or through mutual compatibility, bonds to the organofunctional portion of the silane. Such silanes have had wide acceptance industrially as coupling agents for select purposes. One industrial area of acceptance is the use of silane coupling agents in enhancing the reinforcing qualities of select inorganic fillers or pigments incorporated into select organic polymers.

There is one industrial area where silane coupling agents are emerging as a potentially significant factor in the growth of that area. This area is siliceous filler reinforced rubber. For years, siliceous filler producers have been attempting to replace all or a major part of the carbon black as the prime filler in the reinforcement of rubber. However, siliceous fillers do not match the range of reinforcement qualities of carbon black, particularly so on a weight-cost-performance basis. However, it has been shown that select organofunctional hydrolyzable silanes materially, and in some cases, completely, eliminate those discrepancies in physical reinforcing properties of the composite.

However, the use of such silanes in the manufacture of rubber is not without significant problems. An extremely small amount of these silanes go a long way, and this overcomes their usually high relative cost. However, because only a small amount of silane is used, e.g., from about 0.1 to about 5 parts by weight per 100 parts by weight of the rubber polymer, and because such silanes are low viscosity liquids, their addition to the rubber formulation in processing equipment is fraught with substantial difficulties. The silanes pour so rapidly that thorough and uniform addition into the rubber compound is a hit-or-miss proposition. Such odds are not acceptable to the rubber industry.

The rubber industry employs a number of techniques for the addition of small quantities of a liquid to the rubber masterbatch cycle of the production of a completely formulated rubber. For example, the industry will premix the liquid with a larger quantity of another component added to the batch, or to an inert component such as wax or another polymer so that the addition is of a solid rather than a liquid. Another technique is the absorption of the liquid on a high liquid absorbing particulate material to produce a flowable powder and the powder can be easily added to the batch to disperse the liquid in the compound.

However, this last technique is not always suitable for use in the addition of the aforementioned silanes if the absorbed silane is to be stored for relatively long periods of time, e.g., 6 to 12 months. As mentioned previously, these silanes contain hydrolyzable groups, and once they are hydrolyzed, the formation of siloxane polymers quickly follows. Once the silane hydrolyzes and condenses, it is no longer capable of serving as a coupling agent for the total filler mass in the rubber batch. Thus the silane, to be truly effective as a coupling agent in filled rubber, must be active when supplied to the rubber formulation, be capable of being supplied to the rubber batch and, prior to use, be in a condition which has shelf-life of at least 3 months, preferably, at least 6 months, so that it can meet the various operational conditions that can occur.

The term "filler", as used herein and in the claims, means such inorganic particulate matter characterized by the rubber industry as "pigments", "reinforcing pigments", "semi-reinforcing" fillers and pigments, and "reinforcing fillers". This definition is offered to eliminate any possibility of error in ascertaining the kinds of materials acted upon by the coupling agents. The term "powder" as used herein and in the claims encompasses any inorganic particulate material which has the capacity of absorbing the silanes hereinafter depicted in an amount at least 20 weight percent, based on the weight of the mixture of the silane and the powder, retains after 6 months storage in a closed glass jar the characteristics of a free flowing powder or flowing agglomerates and/or aggregates thereof, and after 6 months storage in a closed glass jar, at least 60 weight percent of the silane is extractable by boiling in monochlorobenzene.

This invention involves a powder silane mixture in which the silane constitutes from about 20 to about 90 weight percent of the mixture and the remainder is the powder. The silanes used in this invention are those which have the formula:

$$HS(CH_2)_xCHRCH_2Si(OR')_3$$

wherein R is hydrogen or methyl, x is 0 or 1, when x is 0, R is hydrogen, and R' is an alkyl group of 2 to 4 carbon atoms.

Illustrative of the silanes covered by the above formula are:

$HSCH_2CH_2Si(OEt)_3$ $HSCH_2CH_2CH_2Si(OEt)_3$ $HSCH_2CH(CH_3)CH_2Si(OEt)_3$ $HSCH_2CH(CH_3)CH_2Si(On-Pr)_3$ $HSCH_2CH(CH_3)CH_2Si(Oi-Pr)_3$ $HSCH_2CH_2Si(Oi-Pr)_3$ $HSCH_2CH_2CH_2Si(Oi-Pr)_3$ $HSCH_2CH_2CH_2Si(On-Pr)_3$ $HSCH_2CH_2CH_2Si(Oi-Bu)_3$ $HSCH_2CH(CH_3)CH_2Si(On-Bu)_3$ $HSCH_2CH_2CH_2Si(On-Bu)_3$ $HSCH_2CH_2Si(On-Bu)_3$ $HSCH_2CH(CH_3)CH_2Si(Oi-Bu)_3$

HSCH$_2$CH$_2$Si(On—Pr)$_3$

HSCH$_2$CH$_2$Si(Oi—Bu)$_3$

In the above, "Et" means ethyl, "i—Pr" means isopropyl, "n—Pr" means normal propyl, "i—Bu" means isobutyl, and "n—Bu" means normal butyl and secondary butyl.

Illustrative of powders, as that term is defined herein, are, e.g., hydrous calcium silicate, diatomaceous silica (or diatomaceous earth), precipitated calcium carbonate, aluminum silicate, and alkyl blocked silica. These powders have been shown to provide the minimum silane hydrolysis and condensation upon storage and absorb the desired amount of the silane.

The nature of R' is very important to this invention. It has been found that methoxy substituted silanes of the formula, i.e., R' would be methoxy, have inadequate shelf-life when placed on the powder surface even though the fresh silane-powder mixture is effective. When R' is larger than butyl, e.g., n-pentyl, n-hexyl, etc., the shelf-life of the absorbed powder is adequate but the coupling activity of the silane is woefully lacking. It has been found that R', as defined in the formula, is critical to the combination of properties desired, i.e., good shelf-life and good coupling activity.

The most desirable alkyl groups are ethyl, n-propyl, n-butyl and sec.-butyl. The i-propyl and i-butyl tend to offer good shelf-life stability on the powder surface, but the reactivity of the silane containing them is reduced as evidenced by lower physical properties of the rubber into which they have been supplied as compared to the same properties seen in rubbers to which have been added silanes with the most desirable alkyl groups. The physical properties of a rubber containing a silane with those less reactive groups can be brought to the level of a rubber containing the other silanes by using a higher compounding (or blending) temperature when the treated powder is added to the rubber compound.

The particle size and particle size distribution of the powder can vary greatly and no particular particle size range seems to be critical. The bulk density of the powders also appear to be extremely variable. No criticality has been found in the surface area size of the powders. Thus, to determine whether a powder functions appropriately, as per the definition above, one must mix the powder and the silane as hereinafter depicted, measure the weight pick-up of the silane, the flow characteristics of the treated powder and the extractability of the treated powder after six months.

The extractability of the silane from the powder is an important test. That silane which is not extracted is considered converted to siloxane of sufficient molecular weight such that upon milling of the treated powder the silsiloxane would not migrate throughout the rubber compound, to become integrally blended therein, and serve to couple the large mass of pigment added to reinforce the rubber, as would the extractable silane.

The absorption of the silane by the powder is effected by simply mixing, preferably gently, of the two materials together until the desired amount of silane is absorbed by the powder. Preferably, the silane is incrementally added to gently stirring powder until the desired amount is incorporated.

As provided by this invention, the amount of silane absorbed may range as desired from 20 to 90 weight percent. It follows that the ability of the powder to absorb such an amount greater than the minimum will be dependent upon those qualities of the powder. Therefore, when determining the amount of silane to use, care should be given to the absorption capacity of the powder for the silane.

Hydrous calcium silicate, diatomaceous silica, aluminium silicates, and alkyl blocked silicas have the ability to absorb the full range of the silane as is specified above.

The preferred amount of the silane absorbed on the powder ranges from about 40 to about 80 weight percent based on the total weight of the silane treated powder. In most cases, the highest amount of silane which can be added will achieve the most favorable economics and the most convenience.

One powder has been shown to be most superior in its absorption ability and stability with respect to its effect on the silane. It is the hydrous calcium silicate such as "Micro-Cel", a trademark of the Celite Division of Johns-Manville, 22 E. 40th St., N.Y., N.Y. 10016. The physical properties of the various Micro-Cel powders sold by the Celite Division are published in its "Celite Technical Data" bulletin, Code Number FA-45A, dated March 1968. It is well known for use in absorbing large amounts of liquids to provide a free-flowing powder containing the liquids.

The rubbers in which the treated powders may be used include, by way of example, natural rubber, butadiene-1,3 styrene copolymers (SBR, GRS), neoprene (polychloroprene), butadiene-1,3 acrylonitrile copolymers, polybutadiene, polybutene, ethylene-propylene terpolymers where the ter-monomers are polyunsaturated (such as butadiene-1,3, 2-methylidene-5-norbornene, 2-ethylidene-5-norbornene, and the like), bromo- or chloro- butyl rubber, polyisoprenes, the polysulfide rubbers, and the like.

The fillers which are incorporated in large amounts vis-a-vis the amount of treated powder of this invention include, by way of example, the siliceous fillers such as hydrated precipitated silica, fumed silica, silica aerogels, silica xerogels; the silicates, such as aluminium silicate, calcium silicate, calcium metasilicate, magnesium silicate; the metal oxides such as aluminum oxide (including the hydrated versions), titanium dioxide, zinc oxide; zirconium oxide; inorganic fibers such as glass fibers, zirconia fibers; aluminum fibers, steel fibers, aluminum oxide fibers; and the like.

If desired, the treated powders can be added to rubbers for the purpose of supplying the silane as a coupling agent to massive surfaces as glass, metals (steel, aluminum, iron), and inorganic oxides (such as cement, aluminum oxide refractories, siliceous refractories, and the like).

Particular mention was made of the use of alkyl-blocked silica as the powder. These powders can be made by mixing such silica powders as silica aerogels, hydrated silica, fumed silica, fused silica, and the like, with a desired amount, such as up to 40 weight percent, basis weight of the filler, of an alkyl hydrolyzable silane. Suitable alkyl hydrolyzable silanes are those of the formula:

$$R°_n—SiX_{4-n}$$

wherein R° is lower alkyl of 1 to about 4 carbon atoms (e.g., methyl, ethyl, n-propyl and n-butyl), X is a hydrolyzable group such as alkoxy (methoxy, ethoxy, n-propoxy, phenoxy), halo (such as chloro, bromo, fluoro), ketoxime, acyloxy (acetoxy, proprionyloxy), and the like, and n is 1 or 2. The preferred silanes are methyl triethoxysilane and methyltrichlorosilane because of their low cost. If a halosilane is used, it may be desirable to neutralize the filler with a base such as NaOH, KOH, $NH_3$, $NH_4OH$, and the like. After the silane treatment is effected, including neutralization if needed, the powder is heated to dry the surface treatment and remove volatiles. A temperature of above 100° C. to 150° C. is adequate.

Though this invention has been thoroughly described above, reference is made to the following examples to set forth the best mode known for practicing the invention.

EXAMPLE 1

Powder silane mixtures were prepared by weighing 37.5 grams Micro-Cel-E ™ (properties below*) into a 1 quart jar followed by the addition, with stirring, of 112.5 grams of silane is indicated in Table 1. Following mixing, when no liquid was visible and a homogeneous mass was obtained, the jars were closed with screw caps and stored at room temperature for a period of nine months.

Rubber compounds were prepared after said nine month period to ascertain the extent to which the various silanes esters may have reacted with the powder. The rubber compounds were all hydrous clay-filled polyisoprene prepared using the following recipe (in parts by weight);

| *TYPICAL PHYSICAL PROPERTIES AND CHEMICAL ANALYSIS OF MICRO-CEL-E™ | | | |
|---|---|---|---|
| | PERCENT BY WEIGHT AS RECEIVED BASIS | | |
| Color | Off White | | |
| Brightness, Tappi Method | 68 | Silica ($SiO_2$) | 54.3 |
| Bulk Density, lbs. per cu. ft. | 5.4 | Lime (CaO) | 25.1 |
| | | Alumina ($Al_2O_3$) | 3.6 |
| Water Absorption, weight percent | 560 | Iron Oxide ($Fe_2O_3$) | 1.2 |
| Oil Absorption, weight percent | 490 | Magnesia (MgO) | 0.5 |
| | | Alkalies ($Na_2O + K_2O$) | 1.3 |
| 325 Mesh Retention, weight percent | 1 | Ignition Loss | 14.0 |
| pH, 10% Water Slurry | 8.4 | | |
| Moisture, weight percent | 5 | | |
| Surface Area, sq. meters per gram | 95 | | |
| Specific Gravity | 2.45 | | |
| Refractive Index | 1.55 | | |

100 parts of polyisoprene, 75 parts of hydrous clay, 5 parts of zinc oxide, 2 parts of stearic acid, 1 part of Age Rite White (Trademark, R. T. Vanderbilt Company, for symmetrical di-beta-naphthyl-p-phenylene-diamine), 1.14 parts of N-oxydiethylene benzothiazole-2-sulfenamide, 0.2 parts of tetramethyl-thiuram disulfide, 2.75 parts of sulfur (oil treated), and silane provided at loadings of 0 (control) or 0.60 parts per hundred parts of neoprene (phr) of neat silane or 0.80 phr of powder-silane mixture containing 75 wt. % silane.

The following Banbury cycle was employed with full cooling water; polymer mixed for 30 seconds, No. 2 speed; Clay, silane (where applicable) added neat or as powder silane mixture, mixed for 30 seconds; zinc oxide and stearic acid added and mixed 15 seconds; dust down chute, mixed No. 3 speed for 30 seconds. The batches were each sheeted off on a 2 roll mill and cooled to room temperature prior to catalyzation on a 2 roll mill at 52° C. The cure characteristics of all compounds were evaluated at 145° C. according to ASTM D-2084 and subsequently cured to $t_c90$. Those cured physical properties are contained in Table I.

TABLE I

| Mixture No. | Silane Monomer | Hardness Shore A[1] | Ultimate Elongation, %[2] | 300% Modulus[2] |
|---|---|---|---|---|
| 1A | None (control) | 56 | 650 | 1030 |
| 1B | $HS(CH_2)_3Si(OCH_3)_3$ neat | 62 | 510 | 2330 |
| 1B' | Silane of 1B plus powder mixture | 58 | 600 | 1370 |
| 1C | $HS(CH_2)_3Si(OC_2H_5)_3$ neat | 61 | 530 | 2080 |
| 1C' | Silane of 1C plus powder mixture | 61 | 540 | 1900 |
| 1D | $HS(CH_2)_3Si(OC_3H_7)_3$ neat | 59 | 560 | 1830 |
| 1D' | Silane of 1D plus powder mixture | 59 | 570 | 1800 |
| 1E | $HS(CH_2)_2Si(OC_2H_5)_3$ neat | 61 | 540 | 2150 |
| 1E' | Silane of 1E plus powder mixture | 59 | 560 | 1900 |
| 1F | $HS(CH_2)_2Si(OC_3H_7)_3$ neat | 60 | 550 | 1980 |
| 1F' | Silane of 1F plus powder mixture | 60 | 550 | 1770 |

[1]ASTM D-314
[2]ASTM D-412

As the above data indicate, based upon stress-strain results, silane powder mixtures of the trimethoxy ester (from this example Compound 1B') failed to maintain high activity when compared to the same silane freshly employed as an integral blend (compound 1B). However, all mixtures based upon ethoxy or n-propoxy esters (compounds 1C' through 1F') have maintained from 80 to 100% the activity of the corresponding integral blend silane addition (compounds 1C through 1F).

As a further check for the presence of free silane monomer, several samples of the mixtures from Example 1 (10 months old) were extracted with refluxing monochlorobenzene in a Soxhlet apparatus. 8.5 to 9.0 grams of each mixture were extracted with 200 cc. of the solvent for 21 hours. The resulting extractants were analyzed by vapor phase chromatography for silane monomer. Table II contains the calculated loss of unreacted silane from the carrier. The results are accurate to ± 5%.

TABLE II

| Silane Monomer in Mixture | Wt. % Silane Removed From The Mixture |
|---|---|
| $HS(CH_2)_3Si(OCH_3)_3$ | 5.71 |
| $HS(CH_2)_2Si(OC_2H_5)_3$ | 75.3 |
| $HS(CH_2)_2Si(OC_3H_7)_3$ | 96.9 |

Thus, both the ethoxy and n-propoxy esters of the mercapto-silane exhibited far greater stability upon storage than did the methoxy ester.

EXAMPLE 2

This example demonstrates the preparation and evaluation of hydrated silica as the powder mixed with mercaptosilane esters at a concentration of 60 weight percent. Additionally, there is shown that modification of the surface of the carrier improved the storage stability of such dispersions.

The silica employed was a precipitated, hydrated silica marketed under the trademark "Hi-Sil"233 by PPG Industries, Inc., Chemical Division, One Gateway Center, Pittsburgh, Pa. having the following typical analysis of:

| | |
|---|---|
| SiO$_2$, as shipped, dry basis, wt % | 94 |
| NaCl, wt % | 1.7 |
| CaO, wt % | 0.80 |
| R$_2$O$_3$, wt % | 0.63 |
| Cu and Mn, combined total wt % | 0.003 |
| Moisture Loss at 105° C., as shipped, wt % | 5.3 |
| pH of 5% Water Suspension | 7.0 |
| Ultimate Particle Size, microns | 0.022 |
| Surface Area (BET), m$^2$/g | 143 |
| Dibutyl Phthalate Absorption, g/100g | 164 |
| Specific Gravity (in rubber) | 2.05 |
| Refractive Index | 1.46 |
| Retained on 325-mesh screen, wt % Hi-Sil 233 | 0.07 |
| Abrasion Loss (Valley Abrasion Apparatus), mg | 10* |

*Test results for distilled water average 5 mg and for absorbent clays 107 mg.

Silane powder mixtures which utilized unmodified silica as the powder were prepared by placing 80 grams of the silica in a glass jar followed by the addition, with stirring, of 120 grams of the mercaptosilane ester. Once all of the silane was added and a flowable powder mixture achieved, the bottles were capped and rolled on a jar roller for one hour followed by storage at ambient temperature. Mixtures of mercaptosilane esters which utilized surface modified silica were prepared as follows. 240 grams of the silica was placed in a 1 gallon glass jar followed by the addition, with mixing, of 60 grams of methyltrimethoxysilane (CH$_3$Si(OCH$_3$)$_3$). Once all the silane was added and a flowable powdery mixture was achieved, the bottles were capped and rolled on a jar roller for 30 minutes. This material was then placed in shallow trays and dried for 30 minutes at 110° C. After cooling to room temperature, 50 grams of this surface modified silica was placed in a glass jar and there was added, with stirring, 75 grams of gamma-mercaptopropyltrimethoxysilane. The resulting mixture was flowable and slightly damp. After capping the jar and tumbling the mixture for 30 minutes on a jar roller, the mixture was stored at ambient temperature. The same procedure was repeated using, instead beta-mercaptoethyltriethoxysilane as the silane coupling agent.

Following aging for six months the mixtures were evaluated in model rubber tire treadstock compounds. The formulation employed (in general order of component addition) contained, in parts by weight: 100 parts SBR 1502 (standard ASTM designation), 50 parts Hi-Sil 210, TM * 1 part neat silane or 1.67 parts silane powder mixture, 8 parts aromatic oil, 1.5 parts 2,2'-benzothiazole disulfide, 1.5 parts di-ortho-tolylguanidine, 5 parts zinc oxide, 2.75 parts sulfur, and 1 part stearic acid. A control compound was also prepared without a silane coupling agent. The compounds were prepared on a two roll mill utilizing roll temperatures of approximately 105° F. and 130° F.

* PPG Industries, Inc., supra.

Specimens of the compounds were compression molded for 15 minutes at 320° F. and physical properties determined according to applicable ASTM (Part 28) specifications.

As an additional check on the activity of the mixtures employed in this example, extractions with refluxing monochlorobenzene were performed. From 15 to 30 grams of dispersion were extracted with from 200 to 250 cc monochlorobenzene for 18 hours. The weight percent mercaptan extracted and then determined and expressed as weight percent of maximum theoretical silane monomer initially present in each dispersion. The rubber test data and extraction results are to be found in Table III.

TABLE III

| RUBBER COMPOUND | 2A | 2B | 2C | 2D | 2E | 2F | 2G |
|---|---|---|---|---|---|---|---|
| Variables: | (control) | | | | | | |
| (a.) HS(CH$_2$)$_3$ Si(OCH$_3$)$_3$ (neat) | — | 1.0 | — | — | — | — | — |
| (b.) 60% silane of (a) in unmodified silica | — | — | 1.67 | — | — | — | — |
| (c.) 60% silane of (a) in modified silica | — | — | — | 1.67 | — | — | — |
| (d.) HS(CH$_2$)$_2$ Si(OCH$_2$CH$_3$)$_3$ (neat) | — | — | — | — | 1.0 | — | — |
| (e.) 60% silane of (d) in unmodified silica | — | — | — | — | — | 1.67 | — |
| (f.) 60% silane of (e) in modified silica | — | — | — | — | — | — | 1.67 |
| PHYSICAL PROPERTIES | | | | | | | |
| Hardness, Shore A | 66 | 69 | 69 | 70 | 68 | 70 | 70 |
| Tear, Die C, ppi | 260 | 330 | 270 | 290 | 320 | 320 | 330 |
| Modulus, 300% psi | 640 | 1740 | 860 | 1010 | 1490 | 1260 | 1630 |
| WT % SILANE EXTRACTABLE FROM DISPERSION | — | — | 13.3 | 20.0 | — | 55.2 | 82.6 |

Referring to Table III, compound No. 2A contains no silane, while compounds 2B, 2C and 2D contain the trimethoxyester of a mercaptoalkylsilane and compounds 2E, 2F and 2G contain the triethoxyester of a mercaptoalkylsilane.

Addition of either silane neat (in liquid form, compounds 2B, 2E) produced the typically large increases in modulus when compared to the non-silane containing control (compound 2A). Based upon the criteria of modulus increase, the addition of the trimethoxyester or the triethoxyester at 60 wt. % concentration on unmodified silica (compounds 2C and 2F, respectively) reveals that very little active trimethoxy ester has released from the surface of the carrier (300% modulus of 860 psi) while the triethoxy ester maintained a high level of activity (300% modulus of 1260 psi). This latter silane ester was also more readily extracted from the dispersion (55% versus 13% for the trimethoxy ester).

The use of methylsilane ester to modify the surface of the silica carrier prior to forming the silane dispersions only slightly improved the stability and performance of the trimethoxy ester (compound 2D, 1010 psi 300% modulus, 20% monochlorobenzene extractable) while the stability and performance of the triethoxy ester was greatly improved (compound 2G, 1630 psi modulus, 82.6% monochlorobenzene extractable).

Thus, the ethoxy esters are inherently more stable in powder mixture form on silica and, in the case of modification of the silica surface, such ethoxy esters provide highly stable mixtures which are comparable to liquid silane in performance even after prolonged storage.

The treated powders of this invention can be employed in any polymeric composition (e.g., epoxy, nylon, polyester, etc.). Because of good shelf-life and excellent handling characteristics of these treated powders, they offer an attractive source for mercapto silane addition where integral blending is sought.

What is claimed is:

1. A powder silane mixture in which the silane comprises 40 to about 80 weight percent of the mixture, the remainder is the powder, wherein the silane has the formula:

$$HS(CH_2)_xCHRCH_2Si(OR')_3$$

in which R is hydrogen or methyl, x is 0 or 1, when x is 0, R is hydrogen, and R' is an ethyl or n-propyl group and the powder is inorganic particulate materials having the capacity of absorbing the aforementioned amount of the silane and providing retention of the characteristics of a free flowing powder or free flowing agglomerates or aggregates after 6 months storage in a closed glass jar and, after 6 months storage in a closed jar, providing that at least 60 weight percent of the silane is extractable by boiling in monochlorobenzene.

2. A curable rubber compound containing the powder silane mixture of claim 1 sufficient to provide 0.1 to about 5 parts by weight of the silane per 100 parts by weight of the rubber polymer.

3. The mixture of claim 1 wherein the silane is:

$$HSCH_2CH_2Si(OEt)_3$$

4. The mixture of claim 1 wherein the silane is:

$$HSCH_2CH_2CH_2Si(OEt)_3$$

5. The mixture of claim 1 wherein the silane is:

$$HSCH_2CH_2CH_2Si(On-Pr)_3$$

6. A process of adding a coupling agent to a rubber compound which comprises adding the powder silane mixture of claim 1 to the rubber masterbatch sufficient to provide 0.1 to about 5 parts by weight of the silane per 100 parts by weight of the rubber polymer.

* * * * *